United States Patent
Ollfisch et al.

(10) Patent No.: US 8,146,387 B2
(45) Date of Patent: Apr. 3, 2012

(54) METHOD AND DEVICE FOR CROWNING GLASS SHEETS

(75) Inventors: Karl-Josef Ollfisch, Roetgen (DE); Thomas Meissen, Baesweiler (DE); Herbert Radermacher, Raeren (BE); Michael Labrot, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 1467 days.

(21) Appl. No.: 10/550,692

(22) PCT Filed: Mar. 26, 2004

(86) PCT No.: PCT/FR2004/000762
§ 371 (c)(1),
(2), (4) Date: Aug. 3, 2006

(87) PCT Pub. No.: WO2004/087589
PCT Pub. Date: Oct. 14, 2004

(65) Prior Publication Data
US 2007/0039354 A1     Feb. 22, 2007

(30) Foreign Application Priority Data
Mar. 29, 2003 (DE) .................. 103 14 266

(51) Int. Cl.
*C03B 23/025* (2006.01)

(52) U.S. Cl. .......................... 65/107; 65/106
(58) Field of Classification Search ...... 65/289
See application file for complete search history.

(56) References Cited

U.S. PATENT DOCUMENTS

| | | |
|---|---|---|
| 4,575,390 A | 3/1986 | McMaster |
| 5,713,976 A | 2/1998 | Kuster et al. |
| 2004/0129028 A1 | 7/2004 | Balduin et al. |

FOREIGN PATENT DOCUMENTS

| | | | |
|---|---|---|---|
| DE | 101 05 200 | | 8/2002 |
| DE | 10105200 A1 | * | 8/2002 |
| DE | 10105300 A1 | * | 8/2002 |
| JP | 61 091025 | | 5/1986 |
| JP | 63 045138 | | 2/1988 |
| JP | 2000 327352 | | 11/2000 |

OTHER PUBLICATIONS

Machine translation of DE 101 05 200 accessed Jan. 7, 2009.*

* cited by examiner

*Primary Examiner* — Matthew Daniels
*Assistant Examiner* — Cynthia Szewczyk
(74) *Attorney, Agent, or Firm* — Oblon, Spivak, McClelland, Maier & Neustadt, L.L.P.

(57) ABSTRACT

A process and system for bending glass sheets heated to their softening point. The glass sheets are laid on a concave bending frame and prebent by gravity. The prebent glass sheets are transferred to a transfer former with a concave forming surface, the transfer former being moved up through the concave bending frame, the perimeter of which is larger, and thus picking up the glass sheets. The transfer former is positioned so that in vertical projection it overlies a final bending former in the form of a frame with a concave forming surface. The transfer former is moved up through the larger-diameter final bending former, the glass sheets being laid on the final bending former. The glass sheets are bent into their final shape, and at the end of the bending operation, the glass sheets in their final shape are transferred from the final bending former to a transport system and cooled.

9 Claims, 4 Drawing Sheets

METHOD AND DEVICE FOR CROWNING GLASS SHEETS

CROSS-REFERENCE TO RELATED APPLICATIONS

The present application is the U.S. counterpart of WO 2004/087589 and claims priority to German application no. 103 14 266.5 filed on Mar. 29, 2003, the entire contents of each of which are hereby incorporated herein by reference.

The invention relates to a process for bending glass sheets, in which the glass sheets are prebent by gravity in a horizontal position on a bending frame and are then bent to their final shape using a final bending former acting on the prebent sheets. It also relates to a system particularly suitable for carrying out this process. Bent glass sheets are often still made into vehicle windows or glazing for buildings.

Document EP 0 705 798 B1 discloses a process for bending, on a frame, one or more glass sheets arranged in pairs, one on top of the other, by gravity, in which the sheet(s) laid on a rigid prebending frame adapt themselves to the profile of this bending frame by gravity. In the next stage of the bending, the sheets to be bent are transferred from the prebending frame situated on the outside to a moveable final bending frame situated on the inside, which can be controlled purely mechanically.

Document DE 43 37 559 C1 discloses a process in which pairs of glass sheets prebent on a bending frame are applied from underneath to a solid upper bending former. The solid bending former is surrounded around its edge by a skirt forming an annular slit with the outer edge of the upper bending former. After the heated glass sheets have been applied to the upper bending former by the bending frame, air is extracted through said annular slit at high velocity. As a result of this, the two sheets are pressed firmly onto the upper bending former. They receive their definitive spherical configuration together. The flow of air into the annular slit must also expel any air inclusions between the two glass sheets.

Another process for bending pairs of superposed glass sheets heated to their softening point is known from document DE 101 05 200 A1. The pair of sheets is in this case laid on a bending frame for prebending by gravity and then transferred in the form of a pair of prebent sheets to a solid bending former with suction, having a concave forming surface, thus ensuring application of the lower face of the lower glass sheet at least around the peripheral edge of the forming surface. The application of a partial vacuum for a predetermined length of time causes the air to be drawn out of the space between the lower face of the lower glass and the suction-type bending former and the pair of sheets is pressed by the ambient pressure against the concave forming face of the suction-type bending former. Following the application of the partial vacuum, the pair of glass sheets in their final shape are transferred from the suction-type bending former to a transfer system and then cooled.

The problem addressed by the invention is how to devise another glass sheet bending process and a system suitable for carrying out this process.

In accordance with the invention, this problem is solved as regards the process by the features of claim 1. The features of claim 10 present a corresponding system. The features of the dependent claims associated with the respective independent claims indicate advantageous embodiments of these subjects.

In the bending process of the invention, the forming of the glass sheets heated to their softening point is carried out in at least two steps, namely a prebending step by gravity on a prebending former and another bending step on a second, final bending former in the form of a frame. The sheets are removed from the prebending former, raised and laid on the final bending former by a transfer former. The transfer former, whose outside dimensions are smaller than the unoccupied openings of the prebending former and of the final bending former, is for this purpose moved up through the prebending former, in the opposite direction to the action of gravity. In the present case, the transfer former picks up the glass sheets and transports them horizontally to a sufficiently great distance above the prebending former, in such a way that the final bending former can be brought underneath the transfer former and lined up with it in vertical projection. The transfer former is then lowered through the final bending former, at which point the glass sheets are laid on the final bending former and put through the final bending operation. The horizontal lining up of the transfer former with the final bending former may be effected by a horizontal movement either of the transfer former or of the final bending former.

Given that the outside dimensions of the transfer former are smaller than those of the prebending former and than those of the final bending former, the peripheral edges of the glass sheets extend beyond the surfaces of the transfer former on which the glass sheets are supported. These peripheral edges form the surfaces of contact with the forming surfaces of a prebending and final bending ring.

The separation of the prebending and final bending ring in the process of the invention has several advantages. In the first place, separate bending tools for the prebending step and for the final bending are simpler and cheaper to produce than a combined tool all on one base frame. Also, the tools can be made more suitable for their respective functions, without having to accept compromises due to lack of available space or because heat transfer is prevented by massive combined tools. Lastly, because of the separation of the prebending and final bending former, an oven can be constructed with two compartments: in the first compartment, one or preferably two or more prebending formers carrying glass sheets are heated to a specified first temperature, while the second compartment comprises a bending cabin in which the final bending former is situated and where the final bending takes place under the influence of a second temperature, higher than the first.

In the simplest embodiment of the process of the invention, both the prebending and the final bending are done by gravity. It is however also possible to perform a third bending step, by equipping the transfer former with additional glass bending means. For example, it is possible to arrange in the transfer former a system for producing a partial vacuum acting on the lower face of the glass sheets and thus producing an additional bending. Such a transfer former may also consist of a solid concave bending former which, unlike frame-type bending formers, can also be used to influence and exactly control the shape and depth of bending of the central regions of the glass sheets.

In another advantageous embodiment of the process according to the invention, the final bending step may, additionally or alternatively, be a press bending step. This needs an upper former, which presses the glass sheets placed on the final bending former to the desired shape in specific regions. The upper former may in this case be annular, in such a way that only the peripheral region of the sheets pressed onto the final bending former is deformed with force. A solid convex upper former is however preferred, with which the whole of the surface of the sheets can be influenced. In addition, the upper former may be equipped with a means for producing an increased pressure or a partial vacuum in order to accentuate the pressing operation. The pressure difference then acts between the upper surface of the glass sheets and the downward forming face of the upper former, and deforms the sheets in the desired manner.

The process of the invention is as suitable for individual glass sheets as for pairs of glass sheets placed on top of each other, which are usually completed as laminated safety glazing after the bending operation.

Following the bending process, the individual glass sheets or pairs of sheets are cooled. If the individual sheets are intended to be made into toughened safety glass, they must be cooled very rapidly, as is known, in order to produce the necessary stresses in the glass. So-called thermal toughening usually has to be carried out on a special toughening ring. The individual glass sheets or pairs of glass sheets can be transferred to a cooling or toughening system by another transfer former, in the same way as when transferring it or them from the prebending former to the final bending former. If a second transfer former is used, the bending process of the invention does not need to make use of differential pressure for transporting the sheets. It is of course also possible to lift the sheets individually out of the final bending former by applying a partial vacuum to the upper former and laying them on a toughening ring. In the case of pairs of glass sheets, a skirt and an air flow passing around the upper former at high speed through the annular slit between the skirt and the upper former can produce a differential pressure by which the pairs of glass sheets can be lifted out of the final bending former.

Other details and advantages of the subject of the invention will be shown, though with no limitation being implied, in the illustrated depiction of different phases of the method in a corresponding system, and by the following detailed description.

In the drawings showing highly simplified representations:

Figure 1:
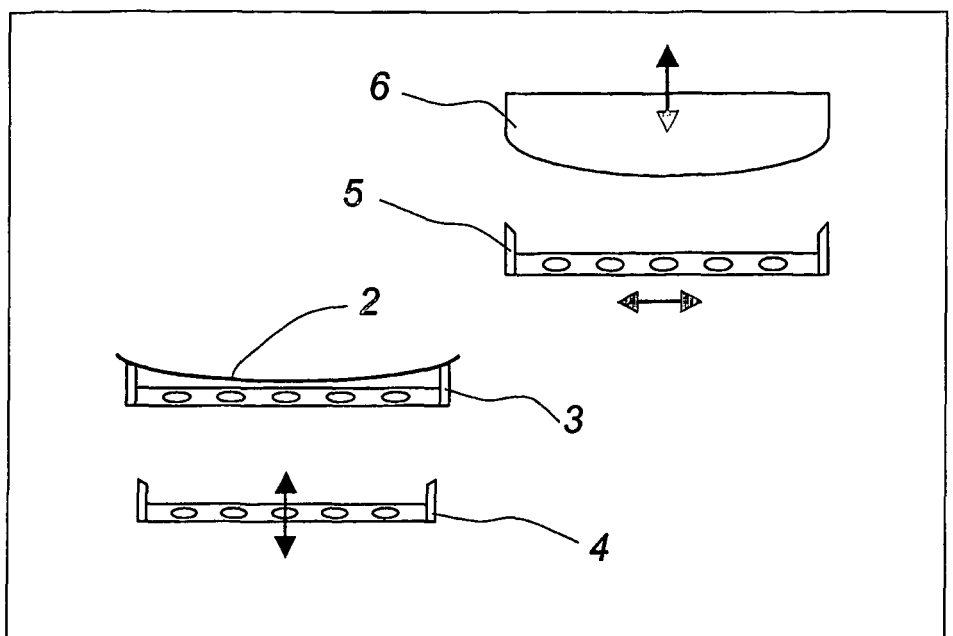
FIG. 1 shows the prebending operation.

FIG. 1 shows, inside a bending station 1 indicated simply by a frame, a glass sheet 2 heated to the bending temperature and placed on a prebending former in the form of a frame 3, having already undergone prebending by gravity. The transport means, with which the prebending former 3 has been brought into the bending cabin, and the heating oven, are not illustrated here. The prebending former 3 can be used for transporting the glass sheet 2 through the heating oven, but it is also possible to use other means for transporting the glass sheets through the oven and then transferring the glass sheet 2 to the prebending former. The prebending step is done by gravity each time on the prebending former 3. This prebending has already taken place by the time we see FIG. 1.

Under the prebending former 3 is a transfer former 4, also in the form of a frame, whose outside perimeter is smaller than that of the unoccupied space enclosed by the forming surfaces of the prebending former 3.

In a position horizontally at a distance from the prebending former 3 and the transfer former 4 is a final bending former in the form of a frame 5 and a solid convex upper former 6. The upper former 6 does not necessarily have to be used, but its use may if required, especially with complex glass shapes, significantly improve the accuracy of the shape, particularly in the central regions of the glass 2 after the bending operation.

The arrows in FIG. 1 indicate in which directions the transfer former 4, the final bending former 5 and the upper former 6 can be moved parallel to the plane of the drawing by drive systems, not shown here. The prebending former 3 may also be transportable for example in a direction departing from the plane of the drawing, to reach the oven (not shown) which may be in perspective behind the bending station 1.

Clearly, all the surfaces that come into contact with the hot glass sheet 2 are machined in the usual way and/or are provided with a heat-resistant woven or knitted fabric and/or with a corresponding coating.

Figure 2:
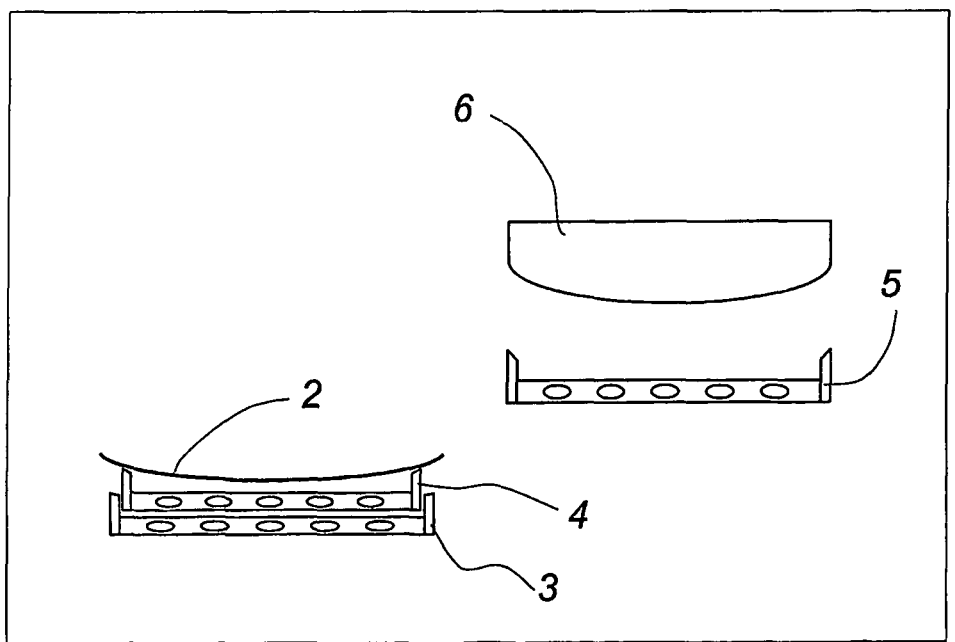
FIG. 2 illustrates the transfer of the glass sheet from the prebending former to the transfer former.

FIG. 2 shows the operation of transferring the glass sheet 2 from the prebending former 3 to the transfer former 4. For this purpose the latter moves up (against the direction of gravity) through the prebending former 3 and thus raises the glass sheet 2 from the forming surface of the prebending former 3. The outer perimeter of the transfer former 4 is slightly smaller than the inner opening of the prebending former in the form of a frame 3, and can thus be passed through the prebending former with a small gap all the way around as it rises. The movement could also of course be the other way around, with the prebending former 3 being lowered around the transfer former 4.

Figure 3:
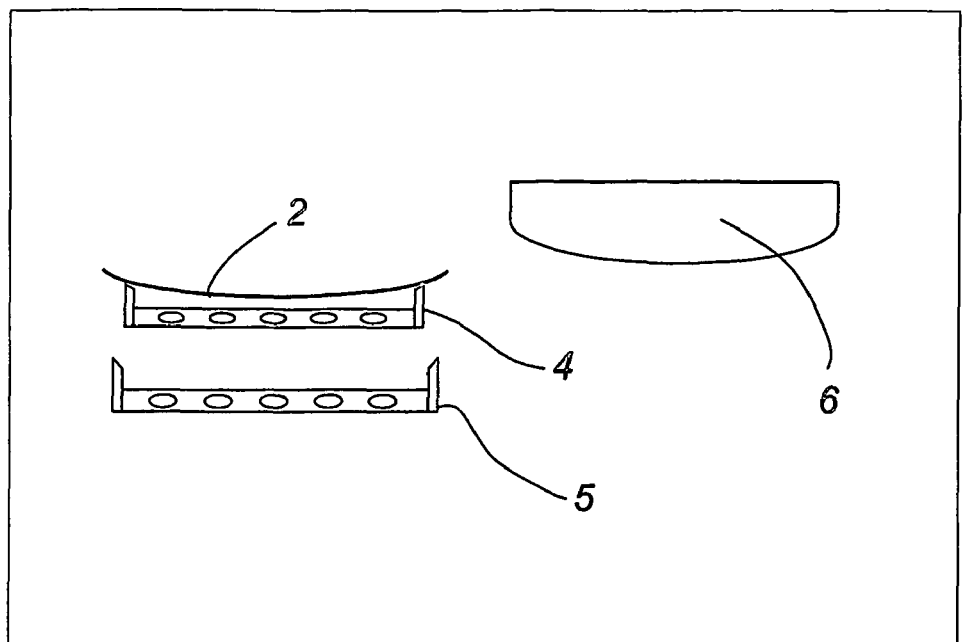
FIG. 3 shows the final bending former being positioned under the transfer former.

FIG. 3 shows the next stage in the bending process of the invention, in which the transfer former 4 with the glass sheet 2 has reached its highest position and in which the final bending former has been moved horizontally and positioned underneath the transfer former. Here again, the movements could of course be switched about, with the transfer former executing the horizontal movement toward the final bending former. The prebending former 3 is in the meantime removed from the bending cabin 1 in order for example to make way for another prebending former carrying the next glass sheet to be bent or even to remove the next glass sheet.

Figure 4:
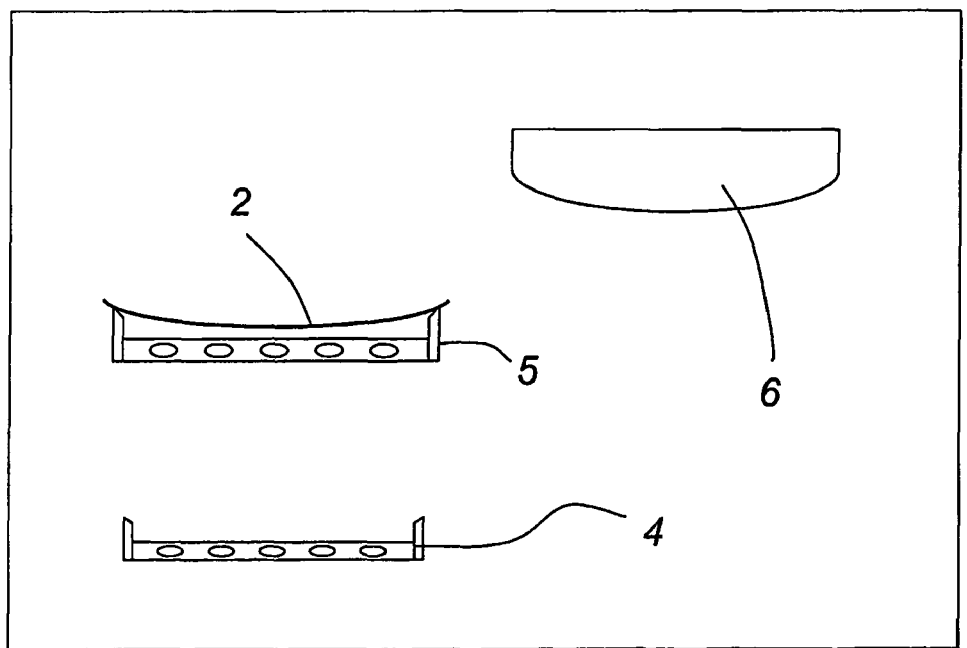
FIG. 4 illustrates the transfer of the glass sheet from the transfer former to the prebending former.

The transfer former 4 is lowered, as FIG. 4 shows, through the final bending former 5, the projecting edge regions of the glass sheet 2 being laid on the forming surfaces of the final bending former in the form of a frame 5. The outer perimeter of the transfer former 4 must again be slightly smaller than the inner opening of the final bending former in the form of a frame 5 to allow it to be passed through the final bending former 5 with a small gap all the way around as it descends.

The transfer former 4 has by now preferably already been lowered in such a way that it is in the initial position ready to transfer a new prebent sheet.

Figure 5:
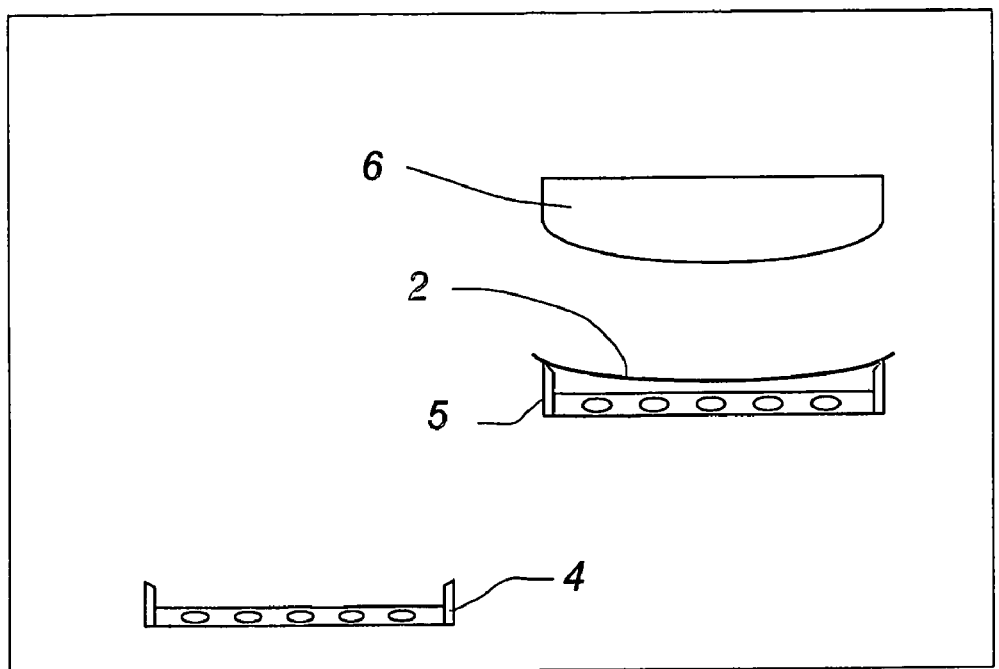
FIG. 5 shows the final bending former being positioned under the upper former.
Figure 6:
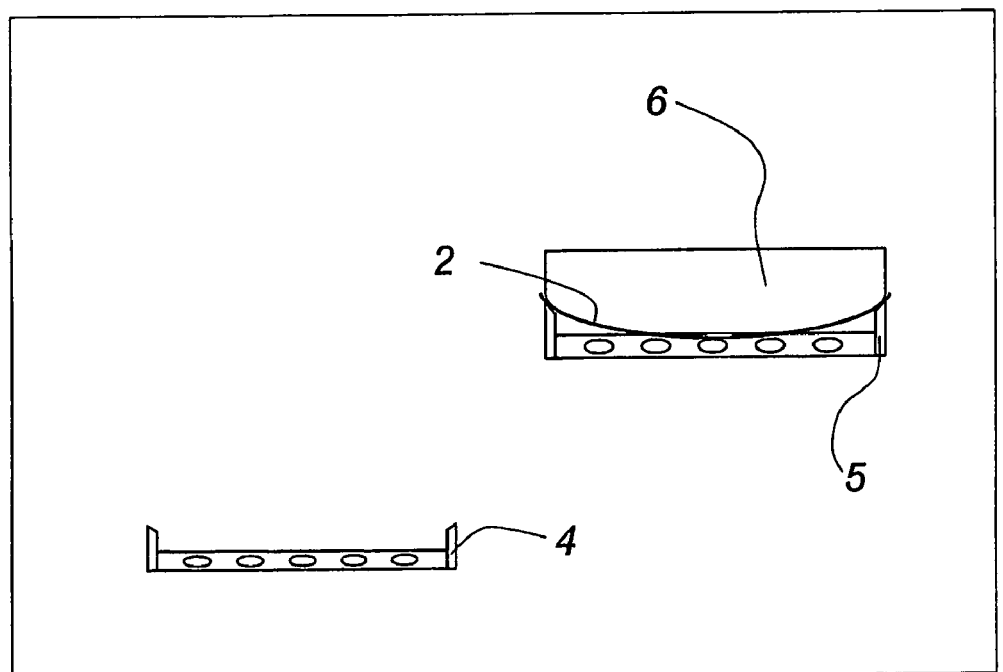
FIG. 6 illustrates the press operation.

For the optional press operation, as mentioned earlier, the final bending former 5 carrying the sheet 2 is positioned horizontally beneath the upper former 6 (FIG. 5). In the next stage of the bending process, shown in FIG. 6, the sheet 2 is pressed against the upper form 6 by the final bending former 5. This press operation is generally necessary when a second gravity bending on the final bending former 5 is not sufficient to achieve the desired bend in the glass 2. The press operation begins with the vertical lowering of the upper former 6, the shape of which is complementary to that of the final bending former 5, in such a way that the edges of the glass are pressed into their definitive form on the final bending former 5. The forming of the middle of the sheet may be further enhanced by producing a differential pressure between the upper surface of the glass sheet 2 and the downward-oriented forming surface of the upper former 6, for example in order to suck the sheet 2 onto said forming surface.

It should be noted that the final bending former 5 could extend, unlike the simplified illustration shown here, at least as far as the edges of the glass, or even past them, if it is used as a press former for applying the glass sheet against an upper former.

Figure 7:
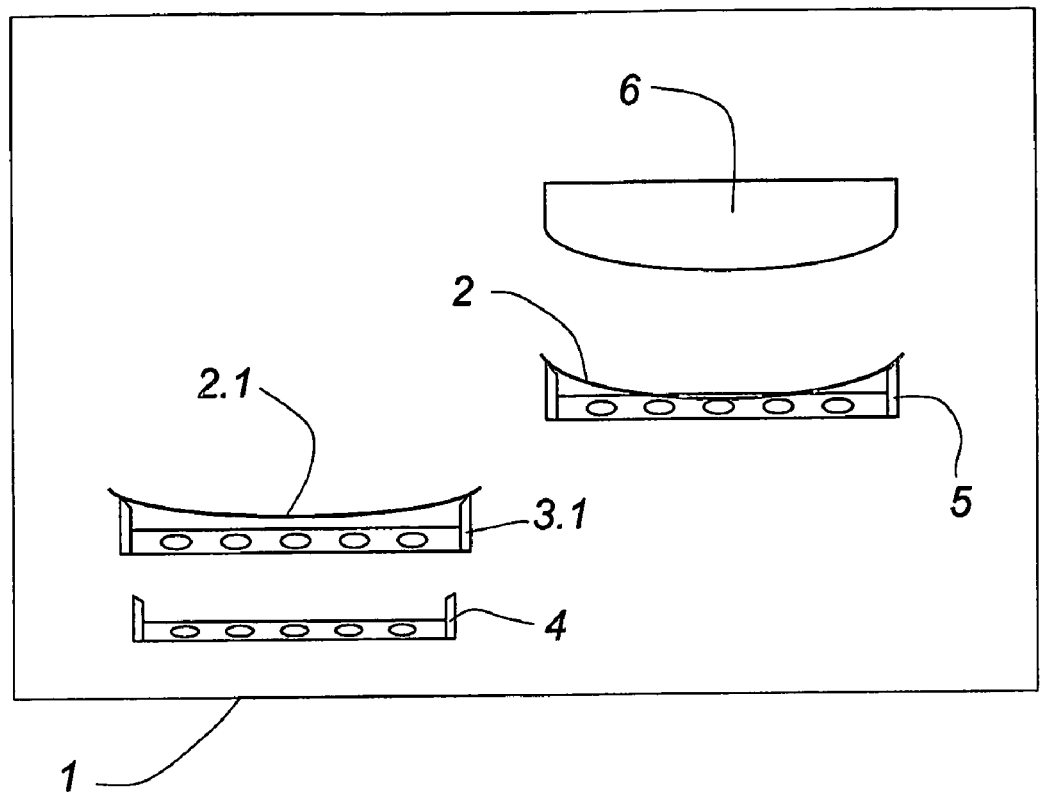
FIG. 7 shows the glass sheet after being pressed in the final bending former.

After the upper former 6 has been raised, the glass 2 is, as shown in FIG. 7, bent to its final shape and can be removed by some appropriate means from the final bending former 5 for cooling or toughening. At the same time a new glass sheet 2.1 is introduced on a prebending ring 3.1 so that the bending cycle can begin again.

As already explained above, the relative movements between the various parts of the bending system can of course be switched. Likewise, the glass sheet may also be a pair of glass sheets, which are bent together.

The invention claimed is:

1. A process for bending glass sheets heated to their softening point, comprising the steps of:
   laying glass sheets on a concave bending frame to be prebent by gravity;
   transferring the prebent glass sheets to a transfer former with a concave forming surface, the outside dimensions of the transfer former being smaller than those of an area enclosed by the concave bending frame, by moving the transfer former in a generally vertical relative movement through the concave bending frame;
   positioning the transfer former to vertically overlie a final bending former in a form of a frame with a concave forming surface, the outside dimensions of the transfer former being smaller than those of the area enclosed by the concave final bending former;
   moving the transfer former in a generally vertical relative movement through the final bending former in a form of a frame, the transferred glass sheets being laid on the final bending former;
   bending the transferred glass sheets into a final shape while being supported on the final bending former; and
   transferring, at an end of the bending step, the bent glass sheets in their final shape from the final bending former to a transport system, and cooling the bent glass sheets.

2. The process as claimed in claim 1, wherein the transferred glass sheets are put through an additional bending operation on the transfer former by a differential pressure.

3. The process as claimed in claim 1, wherein the transferred glass sheets are bent into their final shape on the final bending former by gravity.

4. The process as claimed in claim 1, wherein the transferred glass sheets are bent into their final shape using an upper former complementary in shape to the final bending former, which presses the glass sheets in at least their edge region onto the final bending former.

5. The process as claimed in claim 4, wherein the press bending is assisted by a differential pressure.

6. The process as claimed in claim 1, wherein individual glass sheets are bent.

7. The process as claimed in claim 6, wherein following the final bending operation, the individual glass sheets are removed from the final bending former on a toughening ring and toughened.

8. The process as claimed in claim 1, wherein plural glass sheets placed on top of each other are bent.

9. The process as claimed in claim 8, wherein the plural glass sheets placed on top of each other are, following the final bending, removed from the final bending former on a cooling system and cooled to a temperature below their softening point.

\* \* \* \* \*